Oct. 9, 1951

C. T. McGILL ET AL 2,570,258

FLUID TREATING APPARATUS

Filed June 16, 1945

Inventors.
Chester T. McGill,
Harry Hansen,

Oct. 9, 1951     C. T. McGILL ET AL     2,570,258
FLUID TREATING APPARATUS
Filed June 16, 1945     8 Sheets-Sheet 2
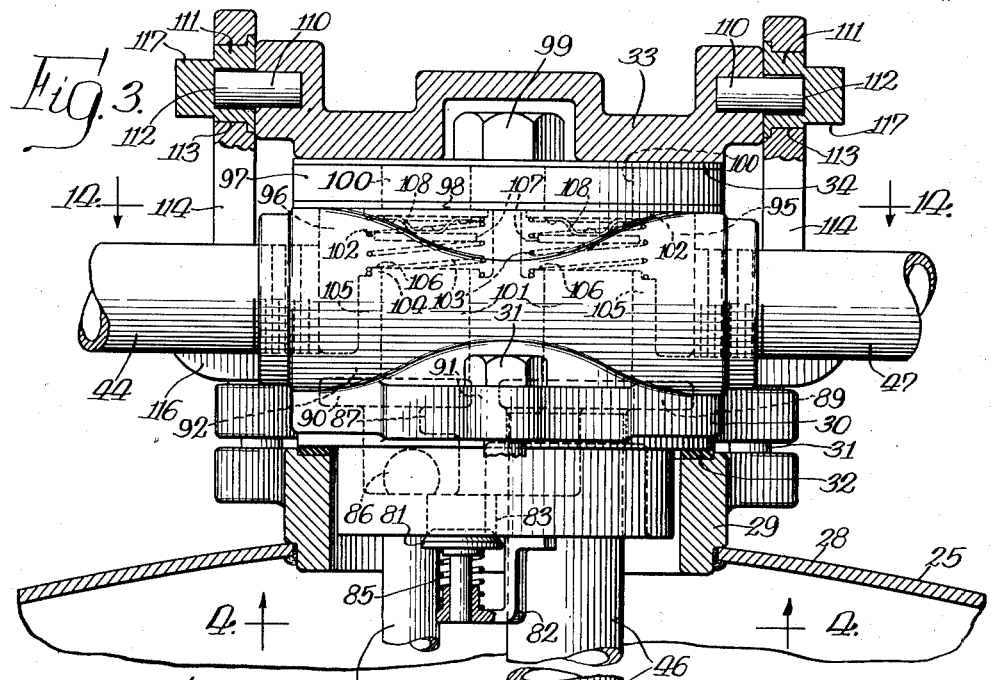
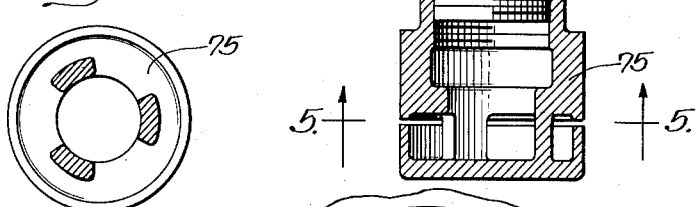
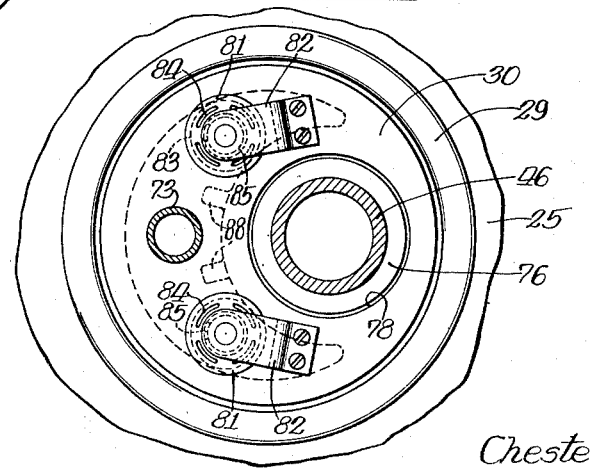
INVENTORS.
Chester T. McGill,
BY Harry Hansen

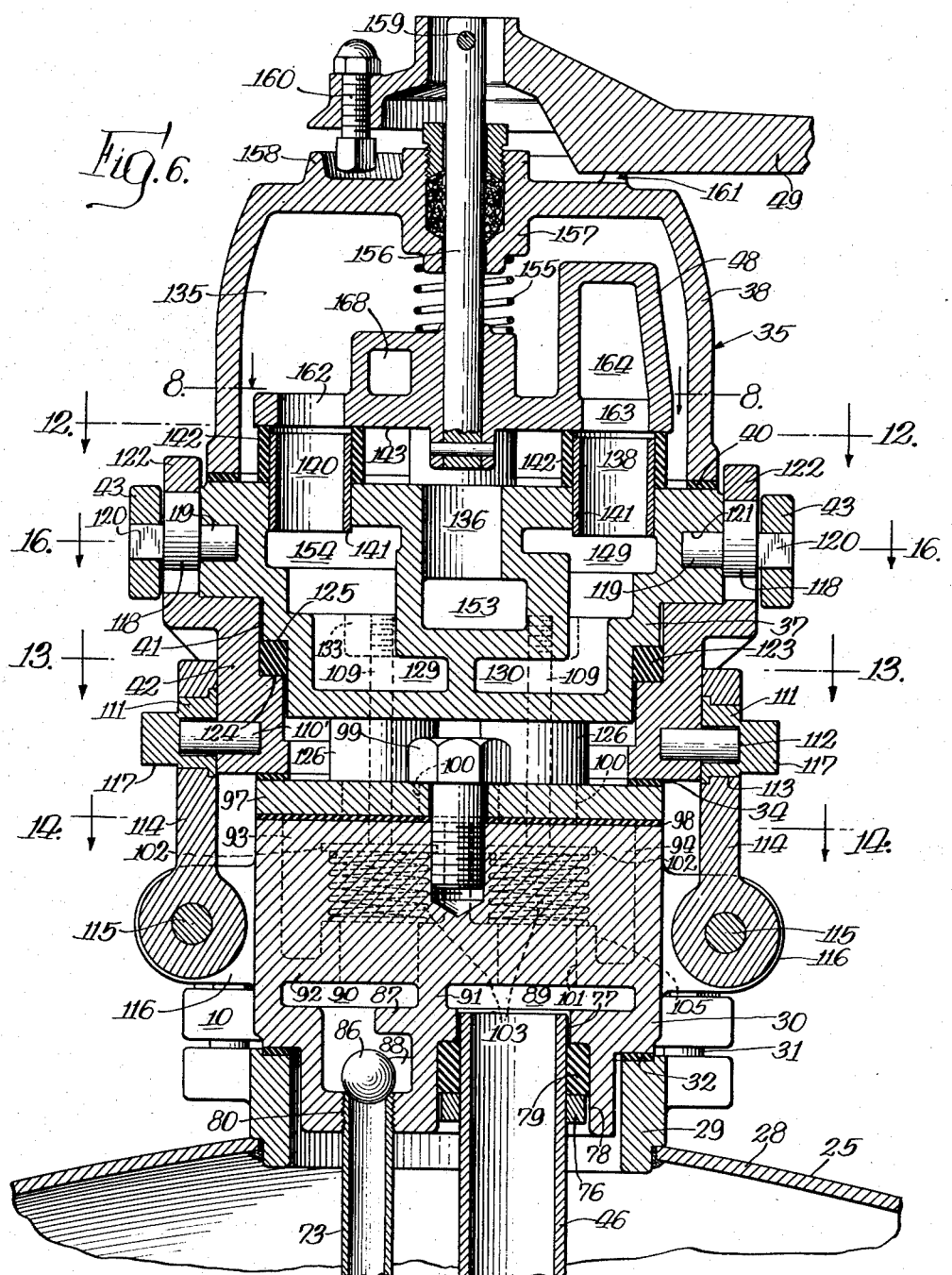

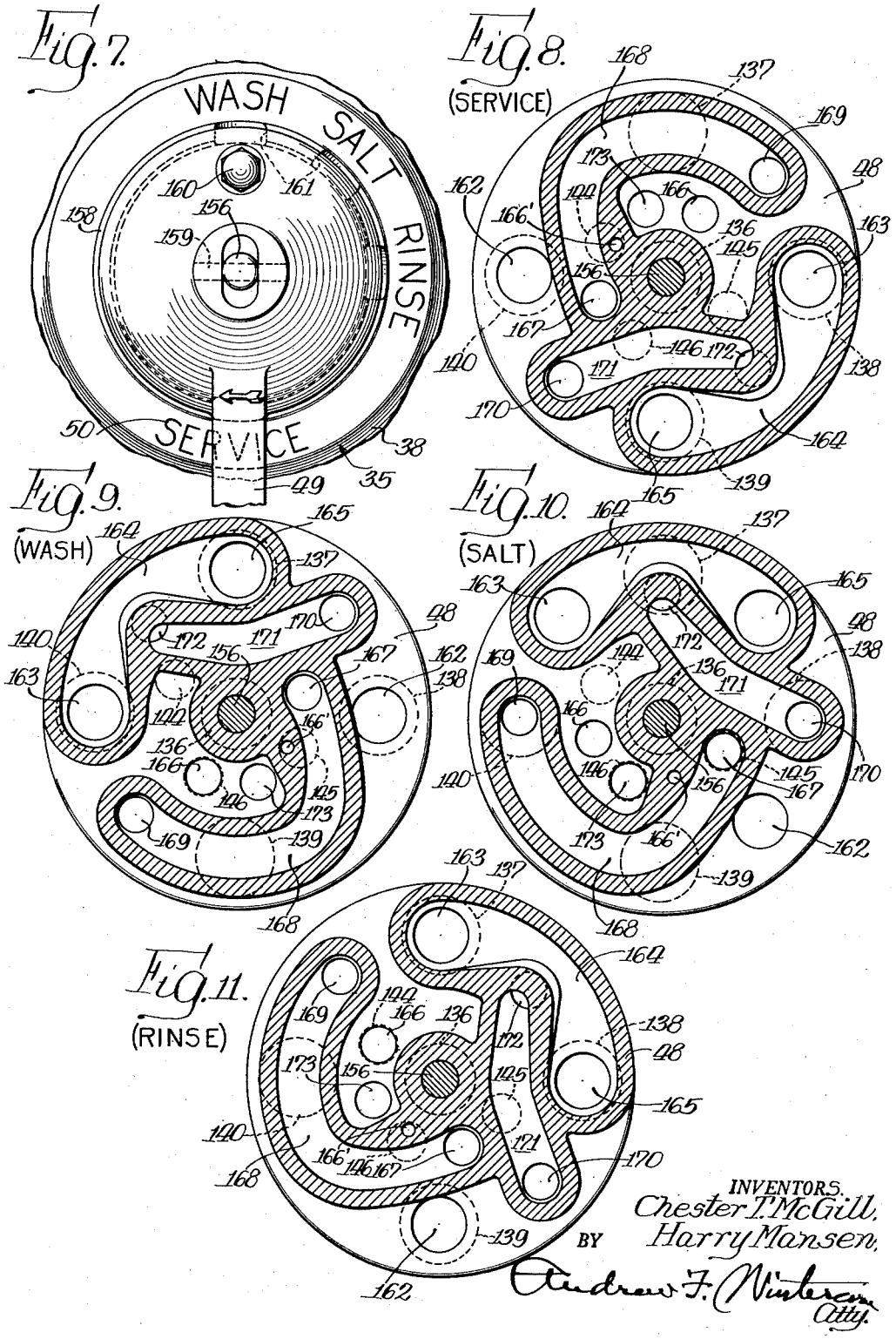

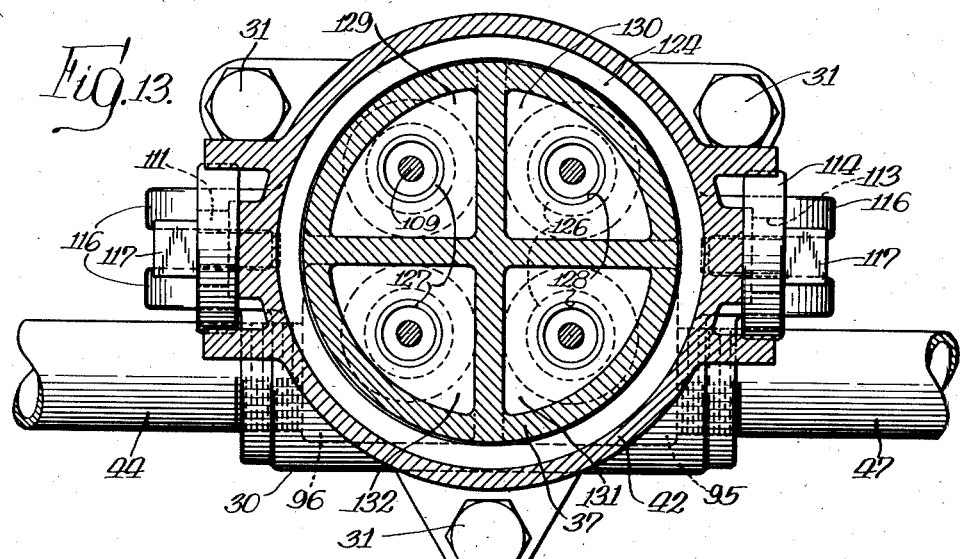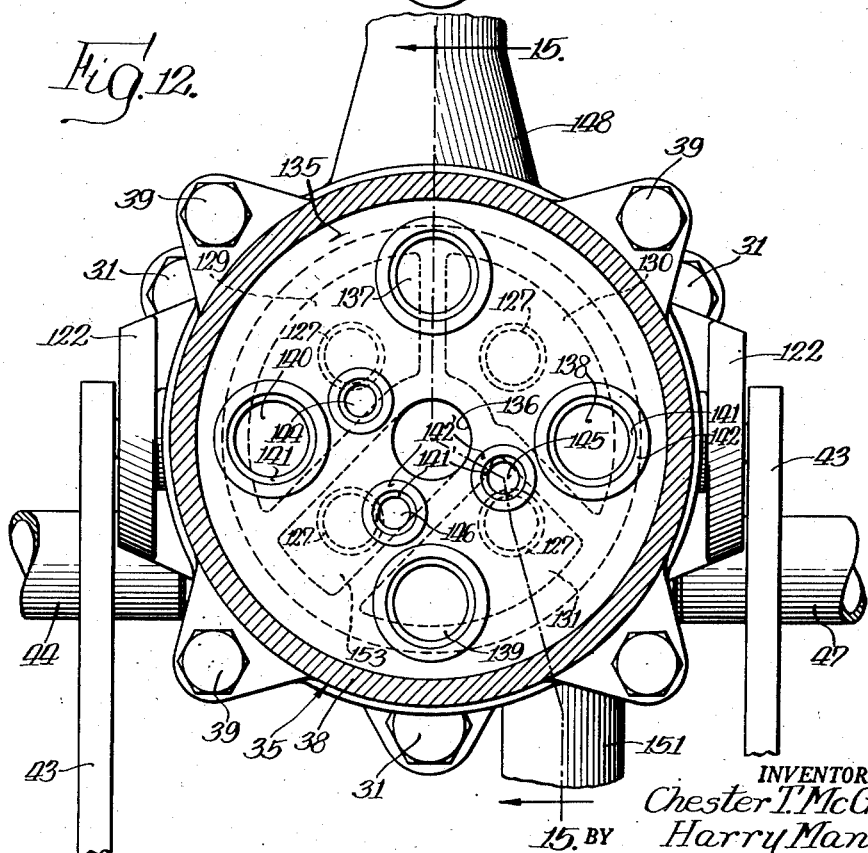

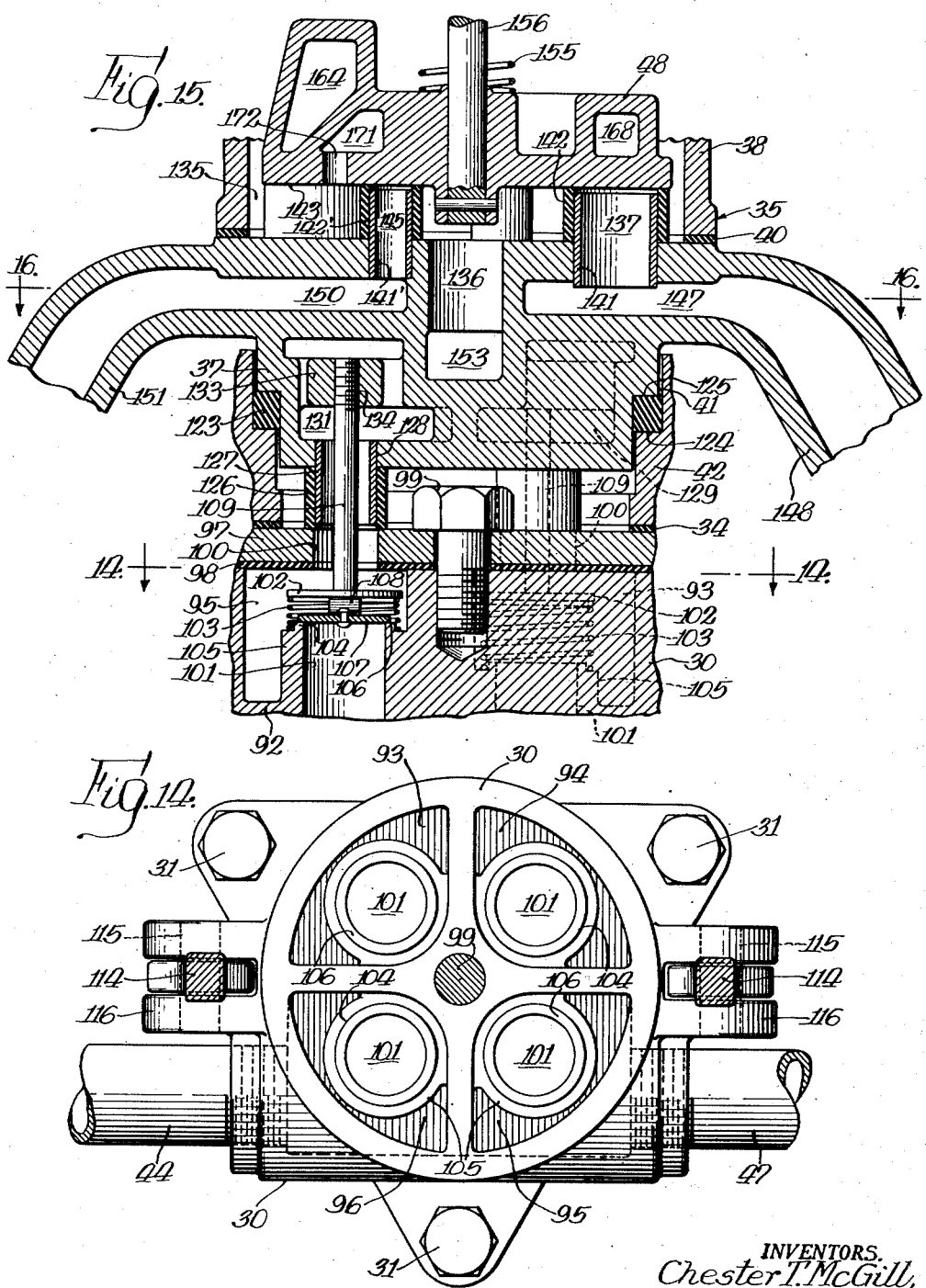

Oct. 9, 1951  C. T. McGILL ET AL  2,570,258
FLUID TREATING APPARATUS
Filed June 16, 1945  8 Sheets-Sheet 7

INVENTORS.
Chester T. McGill,
BY Harry Mansen,

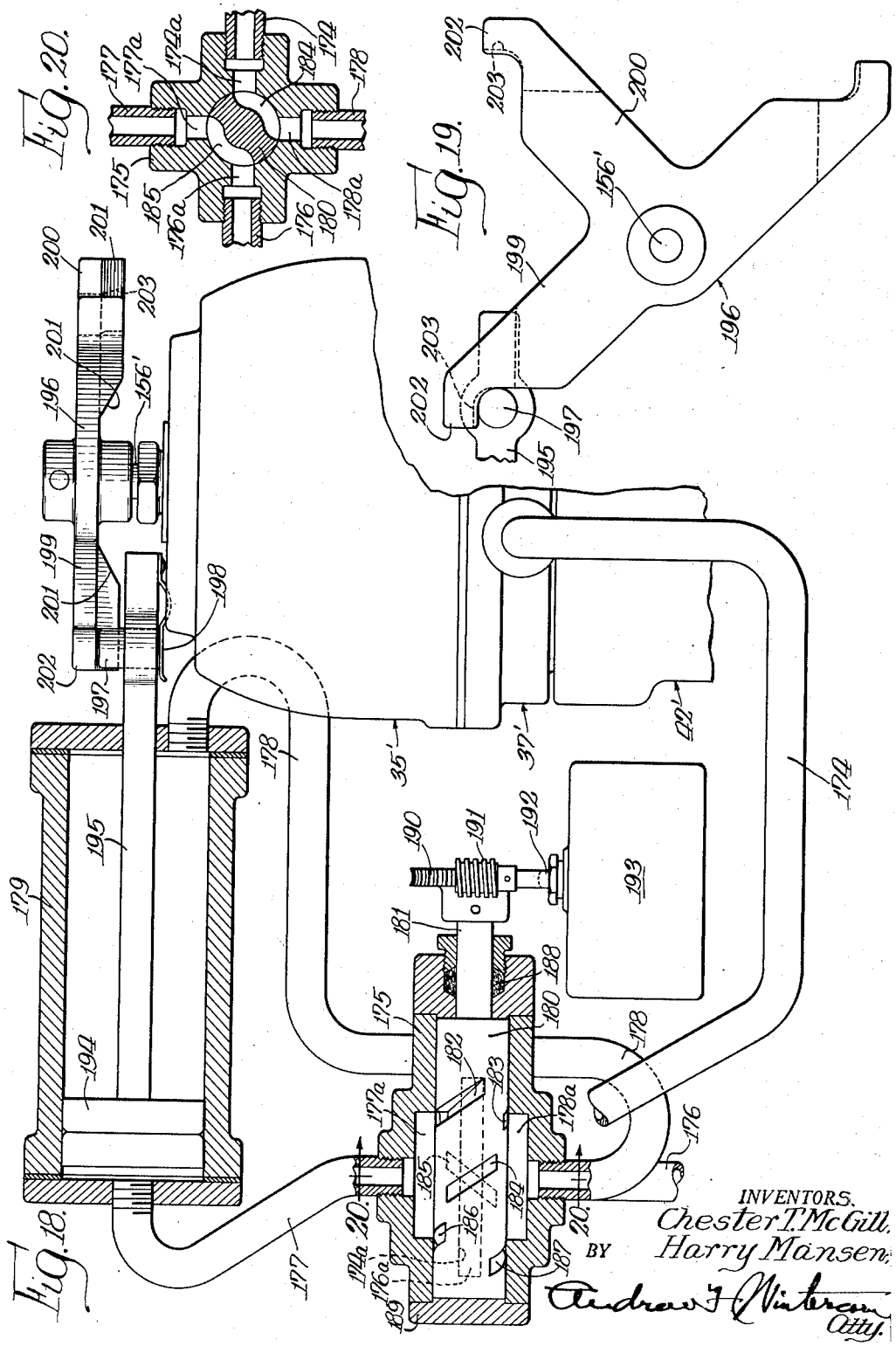

Patented Oct. 9, 1951

2,570,258

UNITED STATES PATENT OFFICE 2,570,258

FLUID TREATING APPARATUS

Chester T. McGill, Elgin, and Harry Mansen, Barrington, Ill., assignors to Elgin Softener Corporation, Elgin, Ill., a corporation of Illinois Application June 16, 1945, Serial No. 599,886

30 Claims. (Cl. 210—24)

This invention relates to a fluid treating apparatus, the invention being herein disclosed as applied to base exchange water softeners.

The regeneration of base exchange water softeners has heretofore been accomplished in several ways:

(1) According to the most generally adopted plan, a stationary brine tank is used in conjunction with each softener installation of one or more softeners, the brine tank being permanently incorporated in the softener piping system and arranged to be temporarily connected with the softener at the time of regeneration by shifting a multi-port valve or operating a number of individual valves. In that type of system, each softener is provided with its own multiport valve or set of individual valves adapted to control not only the brining but the complete cycle of regeneration, usually including the steps of backwashing, brining and rinsing.

(2) A second plan which has been used to a smaller extent involves the installation of a softener tank alone provided with a removable cap, so as to permit the removal of bags of the base exchange material at stated intervals and substitution of other bags containing regenerated base exchange material. Such softeners are commonly referred to as rental type softeners, the user paying a stipulated amount per month to the rental agency, which operates a service plant where the bags of base exchange material removed from the softeners are regenerated.

(3) A third plan is one used particularly in connection with smaller softeners for domestic purposes, provision being made in the piping system for disconnection and removal of the small softener and substitution of another containing regenerated base exchange material, the softener that has been removed being taken to the service plant for regeneration and used again later in the same or another similar installation. Such softeners are also commonly referred to as rental type softeners.

All of these plans are subject to objections of one kind or another. The principal objection to the first plan is that it means a high cost of installation, because each softener requires its separate multiport valve or a separate set of valves, and this is true for hand operated as well as automatic softeners. Besides, it requires the user's attention at intervals when that may not be convenient, and he must keep the brine tank charged with sufficient salt to permit regenerating the softener whenever that becomes necessary, and although the procedure of regeneration is relatively simple, it is, nevertheless, confusing and difficult for the uninitiated and non-technically inclined users, to whom the whole process always seems to have an element of mystery connected with it. The second plan is objectionable chiefly from the sanitary point of view, because the wet bags removed from the softener are exposed to all sorts of possible contamination during the handling and storing thereof. The third plan is objectionable because the softener, in order to be portable at all, must necessarily be fairly small and light, thus giving rise to the necessity for the frequent exchange of softeners and necessitating the use of thin light material in the construction of the tanks, thus giving rise to likelihood of leakage and short life for the unit. Furthermore, in the first plan the saturated brine solution was injected into the softener usually by entrainment of the brine with water flowing through an ejector nozzle, which necessarily involved dilution of the brine. The result was that it was difficult, if not impossible, to control the concentration of the brine solution delivered to the bed.

It is, therefore, the principal object of the present invention to avoid these and other objections to the earlier softeners by providing a water softener of improved construction and a novel apparatus for regenerating the same. The softener made in accordance with our invention is a more practical form of rental type softener, and is arranged to be regenerated in a simpler and more sanitary manner by a portable regenerating apparatus, the regeneration being furthermore far more effective by reason of the fact that brine solution is delivered at controlled concentration to the bed.

The objects of our invention are:

(1) To provide a water softening apparatus using base exchange material, in which one brine tank and one multiport valve form parts of a portable regenerating unit, which is adapted to be used for regenerating any one of a plurality of softeners without necessity for removal of the softeners or their contents from their place of use.

(2) To provide a regenerating apparatus of a portable type, whereby the one unit may be used for servicing a plurality of softeners, whether they be in one installation or in scattered installations.

(3) To provide a portable regenerating apparatus of relatively simple and economical construction having a fitting arranged to be detachably connected to any one of a plurality of softeners of like construction for quick and easy regeneration thereof and without involving any hazards from the point of view of sanitation.

(4) To provide a portable regenerating apparatus which is adapted to take care of the complete regeneration of any one of a plurality of softeners automatically when once properly connected therewith, so that the operator or service man handling the servicing of a number of softeners is free to attend to the regeneration of another or other softeners with another or other portable regenerating apparatuses while the first mentioned softener is being regenerated.

(5) To provide a portable regenerating apparatus of the kind mentioned, in which the rate at which brine is delivered to the softener may be easily controlled and the concentration of the brine or other regenerating fluid is also positively controlled.

(6) To provide a novel regenerating apparatus operating on a different principle than previous apparatuses and applicable to ion exchanging generally and also to water conditioning generally, as, for example, for removal of taste, odor, iron, and so forth, in accordance with which the brine or other reconditioning fluid is arranged to be delivered to the bed of water softening or other water conditioning material at positively controlled concentration for most effective regeneration or reconditioning thereof.

(7) To provide a softener in which the brine, in accordance with the mode of operation just mentioned, is arranged to be drawn into the softener from the brine tank by the suction created in the drainage of water from the softener, thus eliminating the necessity for an ejector and avoiding the objectionable dilution of the brine, and at the same time obtaining a further advantage from the standpoint that the amount of brine delivered may be accurately predetermined by merely adjusting the elevation of a drain trap with respect to the brine tank, and (8) To provide as part of a portable regenerating apparatus of the character described a novel control valve, the superstructure of which is detachably mounted on the base structure, the base structure being permanently affixed to and forming a part of a softener to be regenerated, and there being a plurality of such base structures of identical construction on a plurality of such softeners for cooperation interchangeably with the single superstructure, and there being, in addition, a removable cover-plate affixed to the top of each of the base structures, which when removed permits connection of the superstructure to form the control valve for whichever one of the plurality of softeners is to be regenerated.

Other objects and advantages of our invention will be brought out in the course of the following description, in which reference is made to the accompanying drawings, in which—

Fig. 3 is an enlarged vertical section mainly through the upper end portion of the softener, showing the valve mechanism in the normal operating position for water softening;

Figs. 4 and 5 are sectional details on the correspondingly numbered lines of Fig. 3;

Fig. 6 is a vertical section through the upper portion of the softener, showing the multiport valve mechanism superimposed on the other valve mechanism, as in Fig. 2, for the regeneration of the softener;

Fig. 7 is a plan view of the multiport valve, indicating by legends on the cover of the body the four different valve positions;

Figs. 8 to 11 are horizontal sections on the line 8—8 of Fig. 6 through the stem plate in the four positions indicated by the captions, namely, "Service," "Wash," "Salt," and "Rinse";

Figure 1:
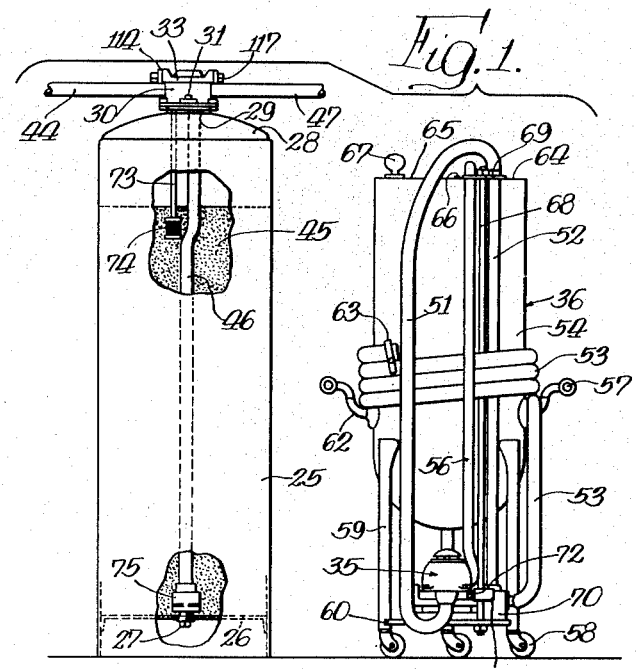
Fig. 1 is a front view of a water softener and a portable regenerating apparatus therefor made in accordance with our invention, the softener being illustrated in service and the regenerating apparatus disposed adjacent the softener ready for connection thereto.
Figure 2:
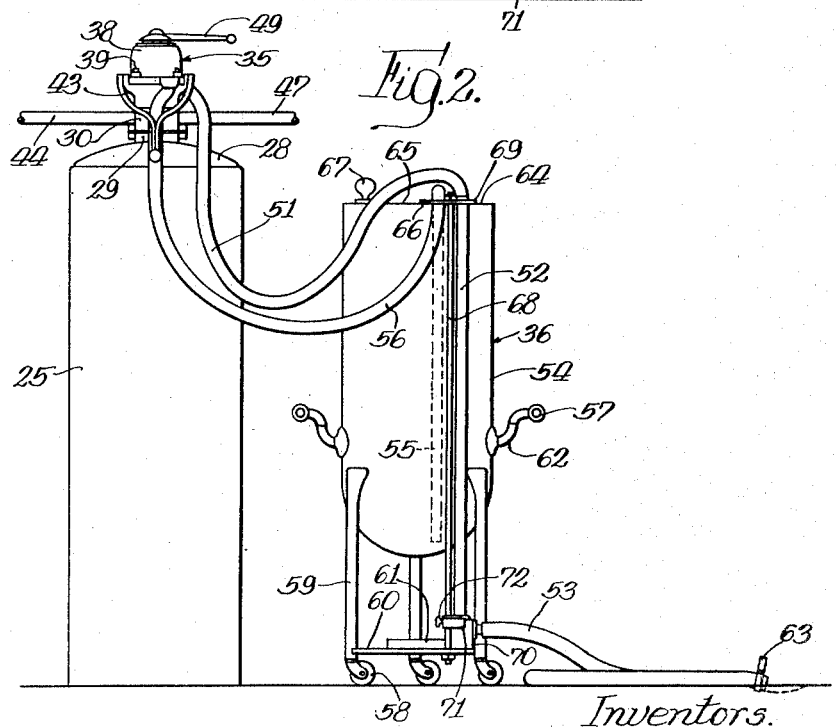
Fig. 2 shows the regenerating apparatus connected to the softener for regeneration thereof.
Figure 16:
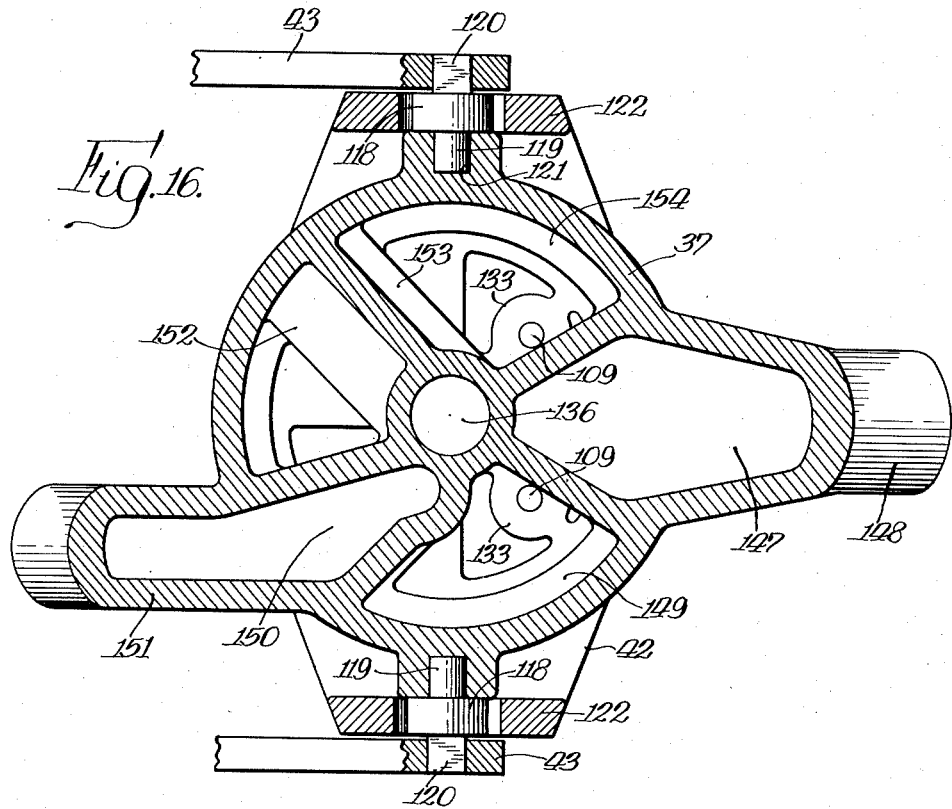
Figure 17:
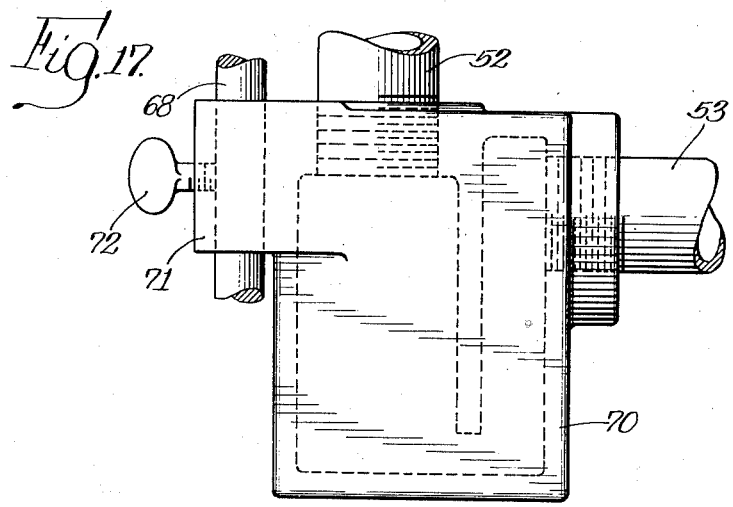

Figs. 12, 13 and 14 are horizontal sections on the correspondingly numbered lines of Fig. 6, Fig. 14 being also taken on the line 14—14 of Figs. 3 and 15;

Fig. 15 is a vertical section on the broken line 15—15 of Fig. 12;

Fig. 16 is a horizontal section on the lines 16—16 of Figs. 6 and 15;

Fig. 17 is a side view on a larger scale of the drain trap forming a part of the regenerating apparatus shown in Figs. 1 and 2;

Fig. 18 is a side view of an automatic valve operating mechanism adapted for use with the multiport valve mechanism shown in Figs. 6 to 16;

Fig. 19 illustrates the Geneva gear for turning the stem plate of the multiport valve, as shown in Fig. 17; and Fig. 20 is a section on the line 20—20 of Fig. 18.

Similar reference numerals are applied to corresponding parts throughout the views.

Referring first to Figs. 1 and 2, the softener illustrated comprises a tank 25 having a bottom 26, in which a small central opening is provided, closed by a screw plug 27. The top 28 of the tank has a larger central opening in which a ring-shaped fitting 29 is welded. A fixed valve body 30, which constitutes the base structure of the control valve, is fastened to the fitting 29 by three screws 31, clamping a gasket 32 therebetween for a water-tight seal. A cover 33 is normally clamped on top of the body 30 compressing a gasket 34 therebetween for a water-tight seal, but this cover 33 is adapted to be removed easily, as will soon appear, to permit mounting on top of the body 30 the superstructure of the control valve, indicated generally by the reference numeral 35, when the softener is to be regenerated using the portable regenerating apparatus, indicated generally by the reference numeral 36. The control valve superstructure comprises a body 37 having a cover 38 fastened on the top thereof by screws 39 compressing a gasket 40 therebetween for a water-tight seal. The base structure 30 and superstructure 35 together form a complete multiport valve capable of handling the complete regeneration cycle for the softener. The body 37 is movable axially in the bore 41 of an adapter fitting 42 which rests on the gasket 34 and makes a water-tight connection on top of the valve body 30 after the cover 33 has been removed for application of the control valve superstructure. Meanwhile the softener is still in service, as will soon appear, the valve body 30 being shut off from communication with the multiport valve body 37 until the latter is given a predetermined axial movement by oscillatory movement of manually operated lever means 43. Thereafter the raw water, which is delivered through a supply pipe 44, instead of being conducted directly through the fixed valve body 30 into the head space in the tank 25 for passage downwardly through the bed 45 of base exchange material for softening and then upwardly through the outlet pipe 46 and again through the fixed valve body 30 for discharge of the softened water to the service system through the pipe 47, is conducted through the multiport valve 35 in whatever directions are determined by the setting of the stem plate 48, the latter being rotatably adjustable by means of the lever 49. The multiport valve may be set in either one of four positions—"Service," "Wash," "Salt," and "Rinse"—as indicated by the captions 50 on the top of the cover 38 in Fig. 7. Generally speaking, the flow of water in the service position of the multiport valve corresponds to the flow prior to the application of the multiport valve, when the cover 33 is still applied to the fixed valve body 30, as in Fig. 1. However, when the stem plate 48 of the multiport valve 35 is shifted by means of the lever 49 to the "Wash" position, the incoming raw water from the pipe 44 is conducted downwardly through the pipe 46 for flow upwardly through the bed 45, so as to break up the bed and rinse out the accumulated scum or sediment deposited on the top of the bed during the softening operation, the waste water being conducted through the flexible hose connection 51 to the vertical pipe 52 on the regenerating apparatus 36 and thence through another flexible hose 53 to the sewer. In the "Salt" position of the stem plate 48 of the multiport valve 35, brine is conducted from the brine tank 54 forming a part of the portable regenerating apparatus 36, through a pipe 55 in said tank, and through a flexible hose connection 56 for passage through the bed 45 of base exchange material to regenerate the same, the spent brine being thereafter conducted through the flexible hose connection 51 and pipe 52 and flexible hose 53 to the sewer. After a predetermined amount of brine has been passed through the bed, the stem plate 48 of the multiport valve 35 is shifted to the "Rinse" position and rinse water is allowed to flow through the bed to rinse out the brine, the waste water being conducted from the softener through the flexible hose connection 51, pipe 52, and flexible hose 53 to the sewer, similarly as in the case of the spent brine. Then, after a predetermined amount of rinse water has been passed through the bed, the stem plate 48 of the multiport valve 35 is shifted back to the "Service" position and the normal flow first outlined is resumed, the softened water being conducted to the service system from the softener through the pipe 47. The lever 43 may now be swung back to its initial position, disconnecting the multiport valve 35 from the fixed valve body 30 in so far as the flow of water from one to the other is concerned, and then the multiport valve 35 along with the adapter fitting 42 may be removed and the cover 33 replaced. While, of course, the primary object of the invention is to provide a portable regenerating apparatus detachably connectible with the softener, so as to permit use of the one regenerating apparatus 36 with any one of a plurality of softeners, like that shown at 25, it will be obvious from the foregoing description that the regenerating apparatus may be used permanently, or at least indefinitely, with one and the same softener.

From this much description, it will readily be appreciated that we have provided a rental type softener which can be regenerated without any of the objections mentioned above in regard to sanitation, because the amount of exposure of the internal portions of the softener in order to effect regeneration is reduced to a minimum and very little reliance must be placed upon the carefulness and cleanliness of the operator or service man for sanitation. Furthermore, it should be evident from this much description that very little labor is involved in effecting regeneration of the softener with our improved portable regenerating apparatus, inasmuch as the unit 36 has handles 57 on opposite sides of the tank 54 by means of which the same may be easily lifted and carried to whatever small extent is necessary, the unit being otherwise arranged to be rolled on the casters 58 provided on the lower ends of the supporting legs 59 of the tank, these casters being, of course, adapted to swivel in the well known way to facilitate making turns and changing the direction of movement at will. A shelf 60 supported on the three legs 59 under the tank 54 serves as a convenient support for the multiport valve 35, as shown in Fig. 1, any suitable means being provided for securely fastening the valve 35 in place on the flat seat 61 provided therefor on the shelf 60, to reduce likelihood of contamination of the bottom face of the valve adapter fitting 42 so long as the valve 35 is so situated. The hose connections 51 and 56 are long enough to reach from the regenerating apparatus 36 to the top of the softener 25 conveniently, and also to reach from the top of the tank 54 to the shelf 60, so that the valve 35 may be conveniently placed on the shelf 60 in the manner stated. The handles 57 have elbow-shaped portions 62 thereon next to the tank 54 to serve as convenient supports on which the coiled hose 53 may be supported, a clip 63 being provided on the free end of the hose to attach said end to the next adjacent coil of the hose when the hose is coiled around the tank, as shown in Fig. 1. The tank 54 will contain a suitable amount of brine solution, at least enough to take care of the regeneration of one softener. The tank has a two-piece cover, one portion 64 of which is tightly secured to the tank and the other portion 65 of which is pivotally connected to the fixed portion by hinges 66 and provided with a handle 67 for opening the same. A vertical rod 68 is disposed alongside the tank and has its upper end attached to a lug 69 extending from the fixed portion 64 of the cover and its lower end secured to the shelf 60. A drain trap 70, which communicates with and is fixed to the lower end of the pipe 52 and has the flexible hose 53 extending therefrom has a bearing portion 71 slidable vertically on the rod 68 and arranged to be clamped in vertically adjusted position by means of a set screw 72. The trap 70 is shown in its lowermost position in Figs. 1 and 2 resting on the shelf 60. The pipe 52 is slidable vertically in a hole in the lug 69 to permit vertical adjustment of the trap 70 as desired. It should be obvious that we may omit the pipe 52 and have the hose 51 connected directly to the trap 70. This hose 51 would then be slidable in the hole in lug 69 and, being flexible, would not project upwardly to the extent that the pipe 52 does when the trap 70 is adjusted upwards. This trap adjustment is for the purpose hereinafter described.

Referring now to Figs. 3, 4, 6 and 15 for a better understanding of the construction of the fixed valve body 30 and the paths taken by the hard water and softened water during normal softening operation, it will be seen that in addition to the pipe 46, which extends downwardly from the fixed valve body 30 to the bottom of the tank, there is a shorter and smaller pipe 73, which, as clearly indicated in Fig. 1, is of such length that its lower end is appreciably below the top of the bed 45. A strainer 74 is provided on the lower end of the pipe 73, and another type of strainer 75 is provided on the lower end of the pipe 46, the latter strainer resting on top of the plug 27, as indicated in Fig. 1. The pipe 46, being off-center relative to the valve body 30, is adapted to be connected with the valve body by compression of a gasket, as hereinafter described. However, it should be clear that we may locate the pipe 46 on center relative to the body 30, so that a threaded connection could be made. Thus, the pipe 46 has a ring 76 welded, or otherwise suitably secured, thereon near the upper end thereof, and this end of the pipe is adapted to be entered in an off-center hole 77 in the bottom of the valve body 30, while the ring 76 enters a counterbore 78 and compresses a gasket 79 in the counterbore above it to seal the connection between the pipe 46 and the valve body 30 so that a threaded connection at this point is unnecessary. It will be remembered that the lower end of the pipe 46 is supported by engagement of the strainer 75 on top of the plug 27, so that the gasket 79 may be compressed in the manner stated. There are three other smaller holes in the bottom of the fixed valve body 30, the pipe 73 being threaded in the middle hole 80, and there being spring closed poppet type check valves 81 supported on brackets 82 on the bottom of the fixed valve body 30 normally seating upwardly to close these two other holes 83. The valves 81 have restricted arcuate slots 84 provided therein, which, when the valves 81 are seated, will permit restricted flow upwardly through the holes 83. However, when the flow is downwardly through the holes 83, the check valves 81 are adapted to open, the pressure of the springs 85 being light enough to permit such opening and there is substantially no restriction to flow. A ball check valve 86 is inserted through the hole 80 before the pipe 73 is screwed in, and this ball is large enough to close the upper end of the pipe 73 and serve as a check valve, as indicated in Fig. 6. A lug 87 above the ball and two other lugs 88 provided on opposite sides of the ball serve to keep the ball caged in operative relationship to the upper end of the pipe 73 when the flow is upwardly through said pipe. The hole 77 into which the pipe 46 is entered communicates with the chamber 89 in the body 30, while holes 80 and 83 with which the pipe 73 and valves 81 cooperate communicate with chamber 90 in said body, these two chambers being separated by a vertical partition wall 91 and being defined below the horizontal partition wall 92. Now, above the partition wall 92, the body 30 is divided by vertical partition walls into four compartments, which have been numbered clockwise 93 to 96, viewing these compartments from above. A plate 97 seals the top of these compartments, and a gasket 98 is compressed between the body 30 and the plate when the screw 99, that is entered through a center hole in the plate and is threaded into a center hole in the body, is tightened. This plate 97 has four holes 100 provided therein opening into the four compartments, and there are registering holes in the gasket 98. The partition wall 92 has four holes 101 provided therein, one opening into each of said four compartments. Between regenerations, the cover 33 acts as a dust and dirt shield for the gasket 34 and plate 97 and, being clamped down tightly, prevents water leakage, in the event the valves 102 tend to leak. The four compartments 93—96 are sealed off from communication with the holes 100, by means of flat disk valves 102 which are urged upwardly into engagement with the gasket 98 by coiled compression springs 103, that are seated around the reduced upper end portions 104 of the necks 105 that project upwardly from the partition wall 92 and define the holes 101 therein. The disk valves 102 will also be held seated by the water pressure in the compartments 93—96, so that spring pressure is not relied upon alone for a good seal. The necks 105 extending into the compartments 95 and 96 are longer, so as to provide valve seats 106 on their upper ends for cooperation with flat disk valves 107, that are resiliently mounted on the bottoms of the related disk valves 102, bowed leaf springs 108 being provided for such support. While we have shown springs 108, it should be obvious that rubber cushions could be provided if desired. It is, therefore, possible to close off communication between the compartment 95 and chamber 89, as well as between the compartment 96 and the chamber 90, when all four of the valve disks 102 are depressed by push rods 109 projecting downwardly from the body 37 of the multi-port valve 35, as shown in Fig. 15 and more fully described hereinafter. However, for the present purpose, it is clear that all four compartments 93—96 are normally sealed off from communication with the holes 100 in the plate 97 by means of the disk valves 102, and under those circumstances the compartments 93 and 96 are in open communication with chamber 90, and compartments 94 and 95 are in open communication with chamber 89. Now, inasmuch as the raw water supply pipe 44 is connected to the fixed valve body 30 in communication with compartment 96, as clearly appears in Fig. 13, and the pipe 47 extending to the service system communicates with compartment 95, as also clearly appears in Fig. 13, it should be clear from the foregoing, by reference to Fig. 3, that the incoming raw water from pipe 44 enters compartment 96 and flows downwardly through the related hole 101 into chamber 90 and thence downwardly through holes 83, the check valve 86 serving to prevent flow downwardly through pipe 73 but check valves 81 being adapted to open to permit such flow. The raw water passes downwardly through the bed 45 for softening, and the softened water goes through the strainer 75 on the lower end of the pipe 46, and flows upwardly through the pipe into chamber 89, and thence through the hole 101 leading into compartment 95 and out of said compartment through the pipe 47 to the service system.

The cover plate 33 has diametrically opposed pin projections 110 onto which rotary eccentrics 111 are adapted to fit, these eccentrics having eccentric holes 112 provided therein to receive the pin projections and being rotatably mounted in bearing holes 113 provided therefor in arms 114 pivoted, as indicated at 115, between the spaced ears 116 projecting from the diametrically opposite sides of the fixed valve body 30. See Fig. 6. The eccentrics 111 have outwardly projecting square shank portions 117, by means of which they may be readily turned with a socket wrench. Thus in the assembling of the cover 33 on top of the softener, the arms 114 are swung upwardly toward the pins 110, and the eccentrics 111 are turned to positions which will permit entry of the pins in the holes 112. Then, when both pins have been entered in the holes the eccentrics are turned through approximately ninety degrees (90°) to force the cover 33 downwardly into water-tight engagement with the gasket 34. In that way there is no danger of any water leakage past the disk valves 102.

Referring now to Figs. 6 and 12 to 15, it should, first of all, be clear that when the cover 33, illustrated in Fig. 3, has been removed, the eccentrics 111 in the arms 114 are available for clamping the adapter fitting 42 for the multiport valve 35 onto the fixed valve body 30 compressing the gasket 34, as illustrated in Fig. 6. The fitting 42 has pins 110' projecting therefrom, which are identical to the pins 110 on the cover 33, and these pins cooperate with the eccentrics 111 in the same manner, so that when these pins are entered in the eccentrics and the eccentrics are turned by means of their square shanks 117, the fitting 42 carrying the multiport valve 35 is clamped securely on top of the fixed valve body 30 compressing the gasket 34 so as to make a water-tight joint. The body 37 of the multiport valve 35, as previously stated, is movable axially in the bore 41 of the adapter fitting 42, such movement being given the body 37 by oscillation of the hand lever means 43. The latter has its arms attached to eccentrics 118, which have trunnions 119 that are concentric with the square operating shanks 120 and rotatable in bearing holes 121 provided therefor in the diametrically opposite sides of the enlarged upper end portion of the body 37, and these eccentrics operate in ears 122 projecting upwardly from the adapter fitting 42, so that when the lever means 43 is swung through an angle of between 90° and 180°, the body 37 of the multiport valve 35 is moved downwardly to the extent predetermined by the throw of the eccentrics 118. Now, that movement is not enough to give rise to any likelihood of interference by the lever 49, but if preferred, two separate wrenches could be provided corresponding to the two arms of the forked lever 43. The movement of the eccentrics 118 is sufficient for the four push rods 109 previously mentioned to unseat the four disk valves 102 and to seat the two disk valves 107 to shut off the compartments 95 and 96 from communication with the chambers 89 and 90, respectively, and this movement is also sufficient to compress a gasket ring 123 between an annular shoulder 124 in the bore 41 and an annular shoulder 125 on the body 37, so as to make a water-tight seal between the body 37 and the fitting 42. In this downward movement of the body 37, four rubber seal rings 126, which closely surround and project downwardly from the ends of metal tubes 127 entered in holes 128 in the bottom of the body 37, are also pressed downwardly on top of the plate 97 around the holes 100 to establish water-tight communication between the four compartments 93-96 in the body 30 and four compartments 129-132 provided in the lower portion of the body 37. There are webs 133 in the upper portions of the compartments 129-132 in which the upper ends of the push rods 109 are threaded, as indicated at 134 in Fig. 15, these rods extending centrally through the tubes 127 to unseat the four disk valves 102 and seat the two disk valves 107, in the manner indicated in Figs. 6 and 15 when the body 37 of the multiport valve 35 is moved downwardly in the fitting 42, as described. It should be clear from this portion of the description that the operator or service man will have no difficulty in mounting the multiport valve 35 on top of the fixed valve body 30, because he can attach the adapter fitting 42 in a leisurely manner before operating the hand lever means 43 to throw the multiport valve 35 into communication with the fixed valve body 30 so that the multiport valve thereafter controls the functioning of the softener. The sealing action at 123 avoids likelihood of any leakage occurring when the disk valves 102 are unseated and before the rubber seal rings 126 are fully seated.

The multiport valve used may vary as to general type and design. The one herein shown is of the well known plate type. The cover 38, as previously stated, encloses the stem plate 48 and provides a water-tight chamber 135 above the body 37, with which a central port 136 in the body has open communication at all times. There are four other large ports 137-140 in the top of the body 37, each of which has a metal seat ring 141 inserted therein and closely surrounded by a rubber seal ring 142, the upper ends of which project sufficiently from the upper ends of the seat rings to provide good water-tight seals by frictional engagement with the flat bottom face 143 on the stem plate 48, while the seat rings 141 serve as supports for these seal rings 142 and also serve to positively limit the compression of the seal rings by letting the stem plate 48 bottom thereon. There are three other smaller ports 144-146 provided in the top of the body 37, and these likewise have metal seat rings 141' and rubber seal rings 142' provided in connection therewith, which cooperate with the flat bottom face 143 on the stem plate in a similar manner. The port 137 communicates with a chamber 147 therebeneath from which the hollow neck 148 extends for connection with the flexible hose 51. See Figs. 15 and 16. Port 138 communicates with chamber 149 therebeneath, which, in turn, communicates with compartment 130 therebelow. See Fig. 6. Port 145 communicates with chamber 150 therebeneath from which the hollow neck 151 extends for connection with the flexible hose 56. See Figs. 15 and 16. Ports 139 and 146 communicate with chamber 152 therebeneath, which, in turn, communicates with compartment 131 therebelow. The central port 136 communicates through the radially extending cored passage 153 with compartment 132 therebelow. Ports 140 and 144 communicate with a chamber 154 therebeneath, which, in turn, communicates with compartment 129 therebelow. So much for the system of communicating ports and passages in the body 37 of the multiport valve 35.

Turning now to Figs. 6, 8 and 15 for an understanding of the ports and passages in the stem plate 48, it will first be noted that the stem plate in Fig. 8 is shown in the service position in relation to Fig. 12, for example, upon which figure the stem plate of Fig. 8 may be considered as superimposed in tracing the flow of water during softening. The stem plate 48, as clearly appears in Fig. 6, is held down yieldingly in engagement with the seal rings 142 by means of a coiled compression spring 155, which surrounds the central stem 156 and has abutment at its lower end on top of the stem plate and at its upper end against the bottom of the stuffing box 157 provided in the center of the top wall of the cover 38. The top wall of the cover 38 has an upstanding circular ridge 158 in concentric relation to the stuffing box 157, and the hand lever 49 for turning the stem plate is pivotally connected to the projecting upper end of the stem 156, as indicated at 159, and has a screw 160 projecting downwardly therefrom and arranged to fulcrum on top of the cover 38, so that the lever 49, which is arranged to be entered selectively in any one of four notches 161 provided in the ridge 158 in circumferentially spaced relation adjacent the legends 50, will be locked releasably in any one of these four positions against accidental turning but may, when raised slightly, enough to disengage the lever from the notch, be turned to turn the stem plate 48 to whatever position is desired. In such an operation of the lever 49 the hydraulic pressure active against the stem plate is relieved enough by means of the lever so that the stem plate may be turned readily without likelihood of damage to the rubber seal rings 142 with which the flat bottom face 143 of the stem plate will preferably remain in contact.

In operation, assuming that the handle 49 is in the service position, the flow of water is as follows: From the raw water pipe 44 into the compartment 132 of the multiport valve body, and thence through radial passage 153 and central port 136 into the chamber 135 in the cover 38, so that the hydraulic pressure is active against the top of the stem plate 48 tending to keep it seated. From the chamber 135, the raw water flows downwardly through a port 162 in the stem plate and through registering port 140 in the body and chamber 154 into compartment 129, thence through one of the tubes 127 into chamber 90 and down into the top of the softener tank through holes 83, similarly as in the operation previously described. The softened water flows upwardly through pipe 46, as before, into chamber 89, and thence upwardly through one of the holes 101 into compartment 94 and up through one of the tubes 127 into compartment 130 and communicating chamber 149, thence through port 138 and port 163 and cored passage 164 in the stem plate, and downwardly through port 165 and communicating port 139 into compartment 131, and thence downwardly through one of the tubes 127 into compartment 95, from which point the softened water is delivered to the service system through pipe 47, as before. It is clear from this description that the flow through the softener is the same as before, but when the multiport valve 35 is superimposed on the softener, the incoming raw water, as well as the outgoing softened water, is caused to flow through intercommunicating ports and passages in the multiport valve. Obviously, therefore, one might leave the regenerating apparatus permanently or indefinitely connected with the softener 25, inasmuch as the multiport valve is adapted to direct the flow through the softener properly for softening, as well as for the different steps of regeneration. Where the multiport valve is to be used only in the regeneration of the softener, there would, of course, be no object in placing the valve in the "Service" position at the commencement of regeneration; it would hasten matters to have the valve shifted to the "Wash" position at the time the multiport valve 35 is connected to the softener.

In the "Wash" position of the valve 35, shown in Fig. 9, the stem plate 48 has been turned through one hundred eighty degrees (180°) from the "Service" position of Fig. 8. In this position, the incoming raw water from the pipe 44, which, as previously described, is continuously delivered to the chamber 135 in the cover 38 from the central port 136, flows downwardly through port 162 in the stem plate and through communicating port 138 into chamber 149 and communicating compartment 130, and thence downwardly through one of the tubes 127 into chamber 94, from which point it flows downwardly through pipe 46 into the bottom of the softener tank for passage upwardly through the bed 45. The waste water containing scum and sediment is permitted to flow at a predetermined restricted rate through the strainer 74 and pipe 73 into chamber 90, thereby further diminishing the rate of flow at the higher elevation of the check valves 81, which are closed under the action of their springs 85 and permit restricted flow through the slots 84 into the chamber 90, whereby to insure escape of finer particles of scum and sediment without danger of any fine particles of the base exchange material escaping at the same time. The waste water is conducted from chamber 90 through the open hole 101 (the other hole being closed by the disk valve 107) into compartment 93, and thence upwardly through one of the tubes 127 into compartment 129 and communicating chamber 154, and through port 140 and communicating port 163 in the stem plate and passage 164 down through communicating ports 165 and 137 into chamber 147 and neck 148 through the hose connection 51 to the drain. During the "Wash" operation, hard water may also be by-passed to the service system through the port 166 in the stem plate and through communicating port 146 in the base to chamber 95 and thence to pipe 47. As will soon be apparent, the ports 173 and 146 could be omitted, if desired, and in such event by-passing of hard water to the service system would occur only in the "Rinse" position (Fig. 11). Also during this wash operation, it will be noticed that a small port 166' in the stem plate is placed in communication with the small port 145 in the body 37 of the multiport valve, and that port communicates with the chamber 150 and neck 151 with the hose connection 56, whereby water may be delivered to the brine tank. This port 166' in the stem plate may be provided of such restricted size in relation to the amount of water required in the brine tank so that the "wash" operation may be correctly timed by the operator noting the rise in level of the water in the brine tank and shifting the valve to "Salt" position when a predetermined level is attained. In an automatic softener the same effect can be obtained by means of a float in the brine tank, the rising of which to a shut-off position starts the valve operating motor. After the back-wash, the handle 49 is turned in a clockwise direction through forty-five degrees (45°) to the "Salt" position, in which position the stem plate is illustrated in Fig. 10.

During the salt-wash or brining operation, illustrated in Fig. 10, the brine from the tank 54 is adapted to be drawn through the softener 25 by suction created by reason of the low level of the end of the hose 53 with reference to the water in the softener tank 25, with which said hose 53 is placed in communication when the multiport valve is shifted to the "Salt" position. The vacuum which the drainage of water from the softener tank tends to create in said tank causes the brine to be sucked in from the brine tank, and, of course, this suction can be regulated by changing the position of the drain trap 70 vertically along the rod 68. On the other hand, if it is desired to augment the force of the suction, that may be done by means of a pump or with an ejector connected at any convenient point in the line of flow, the use of ejectors being well known in this art for that purpose. The brine flows through the softener as follows: From the pipe 55 through hose connection 56 and neck 151 into chamber 150, and thence through the small port 145 and communicating port 167 in the stem plate and cored passage 168 to the port 169 and communicating port 140 downwardly to chamber 154 and communicating compartment 129, and through one of the tubes 127 into chamber 93, and thence into chamber 90 and downwardly past the check valves 81 into the top of the tank 25 for passage downwardly through the bed 45 to regenerate the base exchange material. The spent brine is conducted upwardly through pipe 46 into chamber 89 and communicating compartment 94, and through the related tube 127 into compartment 130 and communicating chamber 149, and thence through port 138 and communicating port 170 in the stem plate and cored passage 171 to the port 172 in the stem plate, and thence through port 137 in the body and into chamber 147 and out through neck 148 and flexible hose connection 51 to the sewer. During the salt flow, there is a port 173 in the stem plate in communication with the port 146 in the body 37 of the multiport valve, so that raw water may be by-passed to the service system through pipe 47, inasmuch as the port 146 in the body communicates with chamber 152 and correlated compartment 131, which, in turn, communicates with compartment 95 into which the pipe 47 leads. The level of the trap 70 in relation to the pipe 55 in the brine tank will determine the amount of brine withdrawn from the brine tank, as should be clear from an inspection of Figs. 2 and 17, the trap being shown in its lowermost position in Fig. 2 for complete drainage of brine from the tank 54. The brine tank should contain only enough brine for one regeneration, so that the tank will be lighter, and, therefore, easier to handle. The brine delivered to the bed may, of course, be at full concentration so that it will regenerate the material most effectively. While we prefer this method of introducing the brine by suction, because of its simplicity and economy, it should be clear that the invention is not to be regarded as limited to this specific operation, inasmuch as the idea of supplying a treating fluid of controlled concentration may be applied also to a gravity type system in which the container of treating fluid is placed high enough in relation to the bed to supply the fluid thereto by gravity. Upon completion of the salt wash the handle 49 is moved in a clockwise direction through forty-five degrees (45°) to the "Rinse" position, in which position the stem plate is shown in Fig. 11.

In the "Rinse" operation, the main flow is as follows: The raw water from pipe 44 is admitted to the chamber 135 inside the cover 38 in the manner previously outlined, and flows downwardly through port 166 in the stem plate and through communicating port 144 in the body into chamber 154 and communicating compartment 129, and thence to communicating compartment 93 and chamber 90 for passage downwardly through the bed, past the check valves 81, to rinse out the spent brine left in the bed 45. The rinse water containing spent brine is conducted from the bottom of the softener upwardly through pipe 46 into chamber 89 and compartment 130 and communicating chamber 149, and through communicating ports 138 and 165 and through passage 164, and downwardly through communicating ports 163 and 137 into the chamber 147, and thence to the sewer through the hose connection 51. Meanwhile, raw water may be by-passed to the service system from the chamber 135 in the cover 38 downwardly through communicating ports 162 and 139, chamber 152, and communicating compartment 131, and thence through compartment 95 to the pipe 47 leading to the service system. Upon completion of the rinsing operation, the lever 49 may be shifted back to the "Service" position, if it is desired to leave the multiport valve 35 on the softener for any length of time, otherwise the multiport valve may be removed at this point, permitting the disk valves 102 to close, so that the normal flow for softening operation previously described in connection with the description of Fig. 3 may be resumed. The removal of the multiport valve 35 from the softener is a reversal of the attaching operation with one exception. After the lever means 43 is turned to permit backing away of the body 37 of the multiport valve, so as to permit closing of the disk valves 102, the lever 49 of the multiport valve is again placed in the "Salt" position, illustrated in Fig. 10, for a short period. The brine tank 54, it will be assumed, is empty and with the connections described above for this position, it is obvious that air will be sucked into the valve 35 from the brine tank, thereby enabling any water remaining in the valve 35 to be drained off to the sewer. In that way the valve 35 will be emptied prior to its removal.

When using the regenerating apparatus as described above, it is obvious that an operator will have to be on hand to shift the lever 49 of the multiport valve from one position to another unless some automatic mechanism is provided, as, for example, like that shown in Figs. 18 and 19, to turn the stem plate at the end of each phase of the regenerating cycle. The automatic mechanism is shown diagrammatically in Fig. 18, wherein the reference numeral 174 designates a pipe connected to the body 37' of the multiport valve 35' in communication with the compartment 132, in which there is always water under pressure, so long as the valve 35' is operatively connected with the softener. The pipe 174 conducts the water under pressure to the plug valve body 175, as clearly appears in Fig. 20. This cylinder also has three other pipe connections 176, 177, and 178 extending therefrom in ninety degree (90°) relationship to one another, as also appears in Fig. 20. The pipe 176 leads to a point in the waste line 51—52—70—53 (see Fig. 2), and the pipes 177 and 178 to the opposite ends of the cylinder 179 (Fig. 18) that is suitably supported on or in rigid relation with the multiport valve 35'. The plug valve body 175 has four internal longitudinally extending grooves 174a, 176a, 177a, and 178a communicating with the correspondingly numbered pipes 174, 176, 177, and 178, respectively, and the plug 180 having a close working fit in said body is adapted to be turned by means of the stem 181. The plug has six helical grooves provided therein, numbered 182 to 187. A suitable stuffing box 188 prevents leakage from the plug valve body along the stem 181, and a cap 189 closes the other end of said body. As indicated in dotted lines in Fig. 18, two of the grooves 174a and 176a are longer than the other two grooves 177a and 178a, the purpose for which will soon appear. Now, the stem 181 has a worm gear 190 thereon, meshing with a worm 191 on the shaft 192 of a motor 193, the nature of which will also be outlined hereinafter. The cylinder 179 contains a piston 194 having a piston rod 195 extending through one end of the cylinder for intermittent actuation of the Geneva gear 196 that is attached to the stem 156' of the multiport valve 35' to turn the stem plate 48 thereof. As clearly appears in Figs. 18 and 19, the piston rod 195 has a pin 197 freely reciprocable in a hole in the outer end portion thereof, said pin being normally held in raised position by means of a leaf spring 198 attached to the bottom of the piston rod. The Geneva gear 196 has three arms of identical form, two of which have been numbered 199 and 200. Two of these arms, the arm 199 and the third arm form a straight line, while the other arm (200) projects perpendicularly from the center of said line. On its lower side, each of these arms has a cam surface 201, and a finger projection 202 on the outer end of each arm is also provided with a cam surface 203 on that side toward the pin 197, as indicated in dotted lines in Fig. 19. In passing, it should be noted that in the use of the present automatic equipment, the valve 35' will be of substantially the same general design as the valve 35, but redesigned only to the extent of permitting ninety degree (90°) movement of the stem plate from one position to another. Multiport valves answering these requirements are available, as, for example, that disclosed in the copending application of Harry Mansen, Serial No. 570,271, filed December 29, 1944. The motor 193 may be of any one of a variety of different types. It may, for example, be of the water wheel type, like the conventional water meter that rotates continuously so long as there is any flow therethrough, in which case there would necessarily have to be a suitable pipe connection (not shown) to supply water under pressure from a suitable source during the regeneration cycle. Other forms of motors suitable for the purpose are referred to below.

The operation is as follows: The operator after having connected the adapter 42' of the multiport valve 35' onto the fixed valve body 30, similarly as above described in regard to multiport valve 35 and adapter 42, places the multiport valve 35' in "Wash" position and starts the motor 193 so as to rotate the plug 180 slowly. Throughout this rotation of the plug, the opposite sides of the piston 194 are alternately connected to the source of water pressure and waste through the pipes 174, 176, 177 and 178 and the grooves in the plug 180. The relative position of the grooves in the plug and speed of rotation of the plug will determine the length of time between each movement of the piston from one end to the other of the cylinder 179. Movement of the piston 194 to the left, in Fig. 18, causes the pin 197 to slide on the cam surface 201, so that it is pushed down against the resistance of the spring 198 until the pin 197 reaches the left hand edge of the arm with which it is cooperating, whereupon it is released and restored by the spring to the operative position shown in the drawings. When the piston 194 moves to the right, the pin 197 pushes whichever arm it is cooperating with, as, for example, the arm 199, in the same direction, thereby causing the gear 196 to turn through ninety degrees (90°). Assuming that the arm 199 is the last of the three arms forming a ninety degree (90°) angle with respect to the arm last operated, it will be obvious that in the next position of the Geneva gear 196 there will be no arm for the pin 197 to engage, and the multiport valve 35' will accordingly be left in its "Service" position, even though the piston 194 continues its back and forth movements until the operator stops the motor 193. It is clear, therefore, that the operator may attach the automatically operable multiport valve to the softener and move the stem plate to the backwash position and leave the softener, with every assurance that the mechanism will attend to the complete regeneration cycle automatically, moving the valve from "Wash" position to "Salt" position and then from "Salt" position to "Rinse" position, and finally from "Rinse" position back to "Service" position.

The automatic operation of the valve 35' can be accomplished in several other ways, as, for example, by the use of a time clock, or by synchronous electric motor, or by a spring actuated motor having release means arranged to operate the stem 181 of the plug valve or the stem 156' of the multiport valve directly. It should also be clear that the present invention is not limited to any particular type of softener or regeneration cycle, because with proper changes of the ports and passages in the valve 35 or 35', the invention may be applied to various water softeners and other fluid treating apparatus. Furthermore, while the automatic operation has been described as attending to the complete regeneration cycle, it should be clear that, if desired, the automatic mechanism may be employed only to attend to the automatic shifting of the valve from "Rinse" to "Service" position, if the operator so desires.

Another feasible method of operation, which is partly automatic, is what is called "internal salting." The operator shifts the valve 35 or 35' to "Wash" and at the end of this period to a neutral position, in which no water is admitted to the softener tank, the tank at this time being open to waste so as to insure at least a partial lowering of the water level therein, both to relieve pressure in the tank and make room for the salt. Then a cover is removed from a tank opening, and a predetermined quantity of salt is poured onto the top of the bed and the cover is replaced. The operator then shifts the valve to "Salt" position and may then leave. The automatic means thereafter takes care of the shifting of the valve 35 or 35' to "Rinse" and back to "Service."

The entirely automatic operation of the mechanism shown in Figs. 18 to 20 may be used to best advantage in connection with softener installations of the kind where there are a number of similar softeners in various residences and a service organization which has agreed to take care of the regeneration of these softeners at stipulated intervals. The softeners and the beds of zeolite material therein are so proportioned as to call for regeneration of a number of softeners in a certain neighborhood at about the same time, say, for instance, once a month. When regeneration of such a group of softeners is due, the agency loads, say six, regeneration units on a truck and the truck is dispatched to the neighborhood where the regenerations are to be taken care of. The operator takes one of these units into the first home and attaches the same to the softener in the manner above described, the brine tank in the unit being filled with the proper amount of brine. Having started the softener in its regeneration, the operator leaves and takes another unit into the next home, where a second softener requires regeneration, and attaches the unit to that softener, and so forth until all six units have been attached to softeners and the regeneration of the softeners has been started. By the time the sixth unit has been connected up with its softener and the regeneration started, the operator can return to the first home and disconnect the regeneration unit, because by that time the regeneration cycle will have been completed for that softener. In like manner, by the time he has removed the regeneration unit from the softener there, the regeneration of that softener having also been completed in the meantime, and so forth to the sixth regeneration unit. The number of regeneration units that will be taken on the truck at one time will, of course, depend upon the estimated length of time consumed in the regeneration cycle and the time required to connect and disconnect the regeneration units.

It is believed the foregoing description conveys a good understanding of all of the objects and advantages of our invention. The appended claims have been drawn with a view to covering all legitimate modifications and adaptations.

We claim:

1. Means for regenerating the treatment material in a fluid treatment tank having means for supplying raw water under pressure to the tank and delivering treated water from the tank, said regenerating means comprising a valve housing mounted on the fluid treatment tank and having inlet and outlet compartments in communication respectively, with said raw water supply and treated water delivery means, said valve housing having openings communicating with said compartments, a portable second valve housing having a body portion adapted to be detachably connected in fluid-tight relationship to said first valve housing in fluid flow communication through the last mentioned openings with said compartments, means for securing the second valve housing in assembled relation to said first valve housing, a portable auxiliary fluid treatment tank, a conduit extending therefrom to said second valve housing to conduct fluid from one tank to the other, and a second conduit extending from said second valve housing to conduct fluid therefrom to waste, and shiftable valve means in said second housing which in different positions of adjustment directs fluid in different circuits through said first tank, some of which circuits include flow through said last named conduits between said tanks and from said first tank to waste.

2. The regenerating means set forth in claim 1 including a mechanism for intermittently automatically operating said shiftable valve means from one position to another, whereby to predetermine the duration of the different phases of regeneration.

3. The regenerating means set forth in claim 1 including a drain trap in the second conduit and means for adjustably fixing the elevation of said trap relative to the two tanks.

4. The regenerating means set forth in claim 1, including valve means normally closing the openings in the first valve housing, and means for opening said valve means when the two valve housings are in assembled relationship, whereby to place the two valve housings in open communication.

5. The regenerating means set forth in claim 1 including an adapter fitting applicable to said first valve housing, said adapter having said second valve housing reciprocable therein, valves normally closing the openings in the first valve housing, push rods for opening said valves extending from said second valve housing, and manually operable means for reciprocating said second valve housing relative to said adapter.

6. Means for regenerating a plurality of substantially alike water softeners each equipped with raw water inlet pipe and soft water outlet pipe connections but devoid of valve means for controlling direction of flow through the softener, said means comprising a portable regenerating apparatus usable for regeneration of each softener and interchangeably for regeneration of any one of said plurality of softeners, the same including a brine receptacle, a single portable valve means constructed for detachable connection substantially alike with each softener in communication with the inlet and outlet pipe connections thereof and interchangeably with each of said plurality of softeners, and conduits portable with the regenerating apparatus and valve means for connecting the valve means and regenerating apparatus whereby to establish connection between the regenerating apparatus and the selected one of said softeners and its raw water inlet and soft water outlet pipes through the valve means for conducting brine from said brine receptacle through the valve means to said softener and for conducting wash water, spent brine and rinse water from said softener through the valve means to waste, said valve means being operable to different positions to establish different fluid circuits through said softener for the different phases of regeneration.

7. The regenerating means set forth in claim 6 including an auxiliary adapter fitting on said softener connected to said inlet and outlet pipes through which communication is established for said pipes with the upper and lower ends of said softener for normal flow of water in one direction through the softener for softening operation, said fitting having a seat upon which the body portion of said single portable valve means is adapted to be detachably mounted in fluid-tight relationship to provide the other circuits of fluid flow through said softener required in regeneration.

8. The regenerating means set forth in claim 6 including a drain trap in the waste conduit adjustable vertically relative to said brine receptacle for the purpose described.

9. The regenerating means set forth in claim 6 including a mechanism for intermittently automatically operating said portable valve means from one position to another whereby to predetermine the duration of the different phases of regeneration.

10. The regenerating means set forth in claim 6 including a mechanism for intermittently automatically operating said portable valve means from one position to another whereby to predetermine the duration of the different phases of regeneration, said mechanism comprising an indexing member attached to and arranged to turn said valve means and having three arms spaced equal angularities, and a reciprocable member movable through a predetermined lineal path to operate one after another of said arms to effect only three angular valve movements, or less, depending on the first position to which the indexing member is set, whereby to change from wash to salt, salt to rinse and rinse to service, or make only the last two or the last one of said valve operations, as desired.

11. In combination, a pair of valves detachably connectable together, the one comprising a body having a plurality of compartments with which fluid conduits are adapted to communicate, the compartments being in two planes separated by a partition wall having openings therein normally affording communication between the compartments, valves normally spring pressed to close openings in an outside wall of said compartments, valve seats on said partition wall around certain of the openings therein, other valves arranged to engage said seats to close said openings and connected to move with certain of said first valves, to be closed in the opening of said first valves, and vice versa, the other valve comprising a body having compartments therein adapted to communicate with certain compartments in said first valve body, means projecting from said second valve body to unseat said spring closed valves and seat the other valves when the second valve body is mounted in cooperative relationship to the first valve body, means for detachably fastening said valve bodies in cooperative relationship, a seat portion on said second valve body having ports in communication with said compartments, a rotary stem plate cooperating with said seat portion having ports and passages therein for establishing different fluid circuits through said cooperating valve bodies in different positions of rotation of said plate, and means for turning said plate.

12. The combination set forth in claim 11 including an adapter fitting for said second valve body constructed for fluid tight connection with said first valve body and having said second valve body reciprocable therein, said second valve body having projecting tubular portions communicating with the compartments therein and arranged to register with and make fluid tight connection with the first valve body on the outside wall thereof at the openings when said second valve body is moved in the adapter into cooperative relationship with said second valve body, and means for so moving said second valve body.

13. In a two-valve combination, wherein one valve establishes a predetermined flow circuit therethrough until connection of the second valve therewith, which thereupon permits different flow circuits to be established through the valves in different operative positions of the second valve, the two valves each comprising a body having ports in an outside wall for communication with corresponding ports in the other valve body, valves spring-pressed to closed position relative to said ports in the first valve body, means on the second valve body to unseat said valves when the valve bodies are juxtaposed, still other valves in the first valve body so connected with the first valves as to be seated in the unseating of the first valves to further alter the flow through said first valve body, and movable valve operating means on the second valve body operable to select different flow circuits.

14. In the art of water softening, means for regenerating a plurality of softeners, each devoid of control valve means required for regeneration flow therethrough, but including raw water inlet and soft water outlet pipe connections, said means comprising a single portable multiport valve detachably connectible between the inlet and outlet pipe connections of any one of said softeners to provide for regeneration circuits therethrough, and a portable regenerating apparatus permanently connected with the valve by flexible conduits.

15. In the art of water softening means for regenerating a plurality of softeners, each devoid of control valve means required for regeneration flow therethrough but including raw water inlet and soft water outlet pipe connections, said means comprising a single portable multiport valve detachably connectible between the inlet and outlet pipe connections of any one of said softeners to provide for regeneration circuits therethrough, and a portable brine tank connected by flexible conduits with said valve to supply brine to the softener to which said valve is connected, when said valve is in salting position.

16. In the art of water softening, a device for regenerating a plurality of softeners, each comprising a tank having a portion on which is a removable cover plate, each of said softeners being devoid of any built-in valves required for regenerating flow through the softener but including raw water inlet and soft water outlet pipe connections, said device comprising a portable regenerating unit usable selectively with any one of said softeners and comprising a brine tank and a plural position valve unit, the brine port of which is connected with said brine tank by a flexible connection, said valve unit having the body thereof formed for detachable mounting on the softener on the same place where the cover plate fits in communication with the softener and said inlet and outlet pipe connections.

17. A device as set forth in claim 16, wherein the regenerating unit further includes a shelf for detachably supporting said valve unit in fixed relation to the brine tank when not in use, said shelf having a seat portion on which the bottom of said unit, which is adapted to connect to the softener, is adapted to be seated to protect it from contamination between uses of the valve unit.

18. A device as set forth in claim 16, wherein the regenerating unit further comprises a drain trap, means for supporting said trap in vertically adjusted relation to said brine tank, and flexible conduit means, one extending from the inlet of said drain trap to the drain port of said valve unit and the other extending from the outlet of said drain trap and to waste.

19. A portable regeneration unit for fluid treating apparatus, comprising a portable tank for regeneration fluid, a multiport valve, means for detachably connecting said multiport valve to a receptacle for material to be regenerated in fluid-tight relationship with said receptacle and with a raw water pipe and a treated water pipe that are connected therewith, means for establishing different flow paths through said valve between said pipes and said receptacle and tank, means including check valves for sealing said receptacle but adapted to be opened automatically by connection of the multiport valve with the receptacle for opening connections between said valve and the interior of the receptacle and also establishing communications with the pipes connected thereto, a drain port in said valve, a flexible conduit extending from the drain port of said valve, and another flexible conduit connecting said tank with another port in said multiport valve.

20. In a brine tank structure for use in combination with a water softener, the combination of a vertically elongated brine receptacle, a brine outlet pipe extending downwardly in said receptacle from the top to a point near the bottom thereof and adapted to have connection with a brine delivery conduit leading to the softener to be regenerated, a drain trap, and a support therefor in rigid relation to said brine receptacle along which the trap is vertically adjustable with reference to the aforesaid brine outlet pipe, said trap being adapted to have connection with a drain conduit extending from the softener to be regenerated.

21. A water treating apparatus comprising, in combination, a tank adapted to be connected in a water supply line for the flow of raw water therethrough and adapted to contain water treating material, a raw water inlet pipe and a treated water outlet pipe connected to said tank, and a control valve structure comprising a base structure permanently connected to said tank and pipes normally to conduct raw water into the tank for passage through the treating material therein and out of the tank to a service system, and a superstructure demountably attached to the base structure in fluid flow communication therewith and with said pipes and adapted to be connected with other conduits for conducting brine to the tank and conducting waste water and spent brine from the tank, said superstructure including shiftable valve means for establishing in its different positions different flow circuits through said tank, pipes, and conduits, as required for regeneration of the treating material in the tank.

22. A water treating apparatus as set forth in claim 21, including a cover-plate to serve as a closure for the base structure of the control valve structure when the superstructure is removed.

23. A water treating apparatus comprising, in combination, a tank adapted to be connected in a water supply line for the flow of raw water therethrough and adapted to contain water treating material, a raw water inlet pipe and a treated water outlet pipe connected to said tank, and a control valve structure comprising a base structure permanently connected to said tank and pipes normally to conduct raw water into the tank for passage through the treating material therein and out of the tank to a service system, check valves sealing openings provided in said base structure but adapted to be opened from the outside of said base structure, and a superstructure demountably attached to the base structure and including means for opening said check valves, whereby to place the superstructure in fluid flow communication with the base structure and with said pipes, said superstructure being adapted to be connected with other conduits for conducting brine to the tank and conducting waste water and spent brine from the tank, said superstructure including shiftable valve means for establishing in its different positions different flow circuits through said tank, pipes, and conduits, as required for regeneration of the treating material in the tank.

24. A water treating apparatus as set forth in claim 23, including a cover plate adapted to serve as a closure for the base structure of the control valve structure and to cover the openings that are closed by the check valves when the superstructure is removed.

25. In a water treating apparatus comprising a closed treating tank adapted to be connected in a water supply line for the flow of raw water therethrough and adapted to contain water treating material adapted to be regenerated by passage of brine through it, and an open brine tank adapted to contain brine suitable for the regeneration of said water treating material, the improvement which consists in the provision of a brine delivery conduit connecting the upper portion of said treating tank with the lower portion of said brine tank, whereby brine is adapted to be transferred from the brine tank to the treating tank by suction created in the treating tank when the water with which the same is adapted to be filled under service conditions is drained, and a drain conduit communicating with the lower portion of said treating tank and having an outlet that is vertically adjustable with reference to the brine tank to predetermine by the elevation thereof below the level of brine therein the amount of brine to be withdrawn therefrom.

26. A portable regeneration unit as set forth in claim 19, including a drain trap connected with the flexible conduit that extends from the drain port in said valve, said drain trap being adjustable vertically relative to said portable tank.

27. A portable regeneration unit as set forth in claim 19, including a vertical support in rigid relation to said portable tank, and a drain trap connected with the flexible conduit that extends from the drain port in said valve, said trap having means for supporting the same on said vertical support at any one of a number of different elevations with reference to said portable tank to predetermine by the elevation thereof below the level of the regeneration fluid in said tank the amount of such fluid to be withdrawn therefrom and transferred to the receptacle containing the material to be thereby regenerated.

28. A portable regeneration unit as set forth in claim 19, including a vertical support in rigid relation to said portable tank, a drain trap connected with the flexible conduit that extends from the drain port in said valve, said trap having means for supporting the same on said vertical support at any one of a number of different elevations with reference to said portable tank to predetermine by the elevation thereof below the level of the regeneration fluid in said tank the amount of such fluid to be withdrawn therefrom and transferred to the receptacle containing the material to be thereby regenerated, and another flexible conduit connected with the drain trap for conducting water therefrom by gravity to a suitable drain receptacle.

29. In a water treating apparatus comprising a closed treating tank adapted to be connected in a water supply line for the flow of raw water therethrough and adapted to contain water treating material adapted to be regenerated by passage of brine through it, and an open brine tank adapted to contain brine suitable for the regeneration of said water treating material, the improvement which consists in the provision of a brine delivery conduit connecting the upper portion of said treating tank with the lower portion of said brine tank, whereby brine is adapted to be transferred from the brine tank to the treating tank by suction created in the treating tank when the water with which the same is adapted to be filled under service conditions is drained, a drain conduit communicating with the lower portion of said treating tank, a drain trap connected with said drain conduit and disposable selectively at any one of a number of different elevations between the top and bottom of said brine tank, whereby to predetermine by the elevation thereof below the level of brine in said brine tank the amount of brine to be withdrawn therefrom, and another conduit connected with the trap for conducting water therefrom by gravity to a suitable drain receptacle.

30. In a water treating apparatus comprising a closed treating tank adapted to be connected in a water supply line for the flow of raw water therethrough and adapted to contain water treating material adapted to be regenerated by passage of brine through it, and an open brine tank adapted to contain brine suitable for the regeneration of said water treating material, the improvement which consists in the provision of a brine delivery conduit connecting the upper portion of said treating tank with the lower portion of said brine tank, whereby brine is adapted to be transferred from the brine tank to the treating tank by suction created in the treating tank when the water with which the same is adapted to be filled under service conditions is drained, a drain conduit communicating with the lower portion of said treating tank, a vertical support in rigid relation to one of said tanks, a drain trap connected with said drain conduit and vertically slidably adjustable on said support and fixable at any one of a number of different elevations thereon between the top and bottom of said brine tank, whereby to predetermine by the elevation thereof below the level of brine in said brine tank the amount of brine to be withdrawn from said tank, and another conduit connected with the trap for conducting water therefrom by gravity to a suitable grain receptacle.

CHESTER T. McGILL.
HARRY MANSEN.

REFERENCES CITED

The following references are of record in the file of this patent:

UNITED STATES PATENTS

| Number | Name | Date |
|---|---|---|
| 515,220 | Harris | Feb. 20, 1894 |
| 837,098 | Morton | Nov. 27, 1906 |
| 887,489 | Marvin | May 12, 1908 |
| 1,255,359 | Uecke | Feb. 5, 1918 |
| 1,611,422 | Duden | Dec. 21, 1926 |
| 1,713,105 | Tannehill | May 14, 1929 |
| 1,718,244 | Marsh et al. | June 25, 1929 |
| 1,763,783 | Hodkinson | June 17, 1930 |
| 1,763,784 | Hodkinson | June 17, 1930 |
| 1,789,314 | Lindsay | Jan. 20, 1931 |
| 1,913,238 | Johnson | June 6, 1933 |
| 1,926,168 | Nylander et al. | Sept. 12, 1933 |
| 1,935,458 | Pick | Nov. 14, 1933 |
| 2,087,157 | Lind | July 13, 1937 |
| 2,146,983 | Pick | Feb. 14, 1939 |
| 2,235,287 | Daniels | Mar. 18, 1941 |
| 2,245,767 | Eickmeyer et al. | June 17, 1941 |
| 2,252,065 | Culligan | Aug. 12, 1941 |
| 2,278,488 | Ralston | Apr. 7, 1942 |
| 2,309,032 | Zimmerman | Jan. 19, 1943 |
| 2,329,350 | Kaysen, Jr. | Sept. 14, 1943 |
| 2,370,190 | Ralston | Feb. 27, 1945 |

FOREIGN PATENTS

| Number | Country | Date |
|---|---|---|
| 348,849 | Italy | June 1, 1937 |